United States Patent
Eyal

(10) Patent No.: US 10,454,995 B2
(45) Date of Patent: Oct. 22, 2019

(54) SYSTEM AND METHOD FOR OBTAINING AND SHARING CONTENT ASSOCIATED WITH GEOGRAPHIC INFORMATION

(75) Inventor: Aviv Eyal, Sausalito, CA (US)

(73) Assignee: CRACKLE, INC., Culver City, CA (US)

(*) Notice: Subject to any disclaimer, the term of this patent is extended or adjusted under 35 U.S.C. 154(b) by 2044 days.

(21) Appl. No.: 11/811,857

(22) Filed: Jun. 11, 2007

(65) Prior Publication Data

US 2008/0307311 A1 Dec. 11, 2008

(51) Int. Cl.
| | |
|---|---|
| *G06F 15/16* | (2006.01) |
| *H04L 29/08* | (2006.01) |
| *G01S 5/02* | (2010.01) |
| *H04W 4/02* | (2018.01) |
| *H04W 4/18* | (2009.01) |

(Continued)

(52) U.S. Cl.
CPC .......... *H04L 67/06* (2013.01); *G01S 5/0205* (2013.01); *G06F 16/743* (2019.01); *G06F 16/78* (2019.01); *H04L 67/18* (2013.01); *H04W 4/02* (2013.01); *H04W 4/185* (2013.01); *H04W 4/026* (2013.01); *H04W 4/21* (2018.02)

(58) Field of Classification Search
CPC ........... G01S 5/0205; G06F 17/30817; G06F 17/30849; H04W 4/02; H04W 4/1851; H04W 4/206; H04W 4/026; H04L 67/18; H04L 67/06
USPC .................................. 709/217, 206, 224
See application file for complete search history.

(56) References Cited

U.S. PATENT DOCUMENTS

| | | | |
|---|---|---|---|
| 4,663,629 A | * | 5/1987 | Tagami et al. ........... 340/995.28 |
| 6,014,090 A | | 1/2000 | Rosen et al. |

(Continued)

FOREIGN PATENT DOCUMENTS

| | | |
|---|---|---|
| CN | 1551664 A | 12/2004 |
| JP | 8-335034 | 12/1996 |

(Continued)

OTHER PUBLICATIONS

Jefferson Graham, *Flickr of idea on gaming project led to photo website*, USA Today (Feb. 27, 2006) available for download at http://usatoday30.usatoday.com/tech/products/2006-02-27-flickr_x.htm.*

(Continued)

*Primary Examiner* — David R Lazaro
*Assistant Examiner* — Mariegeorges A Henry
(74) *Attorney, Agent, or Firm* — Mayer & Williams, PC

(57) ABSTRACT

A system and method are provided that allow the obtaining, categorization, discovery, and navigation of content, in particular video content. The system may be operable for a user, for a set of people authorized by the user, or for anyone with an Internet connection. The system employs a desktop software application, an Internet file sharing service, or a combination of both. The system includes an integrated content detector, such as a video camera, with an upload component and a geographic location detector. In use, for example, a user may view a map indicating the locations where video clips were recorded by the user's camera. Any video can then be watched, for example, in a window overlaid on the map, by selecting the same. In one example, a trip may be reconstructed on a map and videos of different locations can be viewed by interacting with the map and map overlays.

20 Claims, 3 Drawing Sheets

(51) Int. Cl.
*G06F 16/74* (2019.01)
*G06F 16/78* (2019.01)
*H04W 4/21* (2018.01)

(56) References Cited

U.S. PATENT DOCUMENTS

| | | | |
|---|---|---|---|
| 6,154,172 | A | 11/2000 | Piccionelli et al. |
| 6,629,136 | B1 | 9/2003 | Naidoo |
| 8,055,271 | B2 * | 11/2011 | Nair ........................ H04W 4/02 455/418 |
| 8,548,424 | B1 * | 10/2013 | Mikan et al. |
| 2004/0054665 | A1 | 3/2004 | Yoo et al. |
| 2005/0004986 | A1 * | 1/2005 | Aoki ........................ G06F 9/543 709/206 |
| 2005/0086087 | A1 * | 4/2005 | Razza .................. G06Q 10/025 705/5 |
| 2005/0186965 | A1 * | 8/2005 | Pagonis et al. ............. 455/456.1 |
| 2005/0275726 | A1 * | 12/2005 | Abraham et al. ......... 348/207.99 |
| 2006/0022048 | A1 * | 2/2006 | Johnson ................ H04L 69/329 235/462.1 |
| 2006/0154674 | A1 * | 7/2006 | Landschaft ....... H04M 1/72572 455/456.6 |
| 2006/0181546 | A1 * | 8/2006 | Jung .................. G01C 21/3667 345/619 |
| 2006/0240847 | A1 * | 10/2006 | Choi ........................... 455/456.2 |
| 2006/0291806 | A1 * | 12/2006 | Ikeda et al. ...................... 386/95 |
| 2007/0118281 | A1 | 5/2007 | Adam et al. |
| 2008/0247336 | A1 * | 10/2008 | Sugitani ............... H04B 7/2643 370/280 |
| 2009/0197612 | A1 * | 8/2009 | Kiiskinen ............. H04W 64/00 455/456.1 |

FOREIGN PATENT DOCUMENTS

| | | | |
|---|---|---|---|
| JP | 2000-235576 | 8/2000 | |
| JP | 2001-292389 | 10/2001 | |
| JP | 2003-209779 A | 7/2003 | |
| JP | 2003-233555 | 8/2003 | |
| JP | 2003-288005 | 10/2003 | |
| JP | 2006-33273 | 2/2006 | |
| KR | 1020060095601 A | 9/2006 | |
| KR | 10-2007-0002159 A | 1/2007 | |
| WO | WO 98/54896 | 12/1998 | ............... H04N 5/91 |
| WO | WO 02/17130 A3 | 2/2002 | ............... G01S 5/14 |
| WO | 2003007542 A1 | 1/2003 | |
| WO | 03101139 A1 | 12/2003 | |
| WO | WO 2004/090903 A1 | 10/2004 | ............ G11B 27/10 |
| WO | 2006018712 A1 | 2/2006 | |

OTHER PUBLICATIONS

James Fallows, *Spy's-eye View*, The Atlantic (Mar. 2006), available for download at http://www.theatlantic.com/magazine/archive/2006/03/spy-s-eye-view/304620/.*

Rick Vidallon, "How to Embed Your Youtube Video into Google Maps", 2006, 5 pages. http://www.visionefx.net/articles/how-to-embed-youtube-video-in-google-maps.htm.

Alex Chitu, "Google Operating System Unofficial news and tips about Google", Jun. 23, 2006, 3 pages. http://googlesystem.blogspot.com/2006/06/google-maps-youtube-video-map.html.

Alex Chitu Google Operating System Unofficial News and Tips about Google, Jun. 23, 2006, 2 pages. http://googlesystem.blogspot.com/2006/06/panoramio-google-maps-with-photos.html.

Author Unknown, 2 pages, http://vidteq.com, date unknown.

Author Unknown, http://Atlas.freshlogicstudios.com, copyright 2010, 2 pages.

Author Unknown, http://Clipglobe.com, 2 pages. Copyright 2007.

Author Unknown, http://Virtualtourist.com, 5 pages Copyright 1994-2013.

* cited by examiner

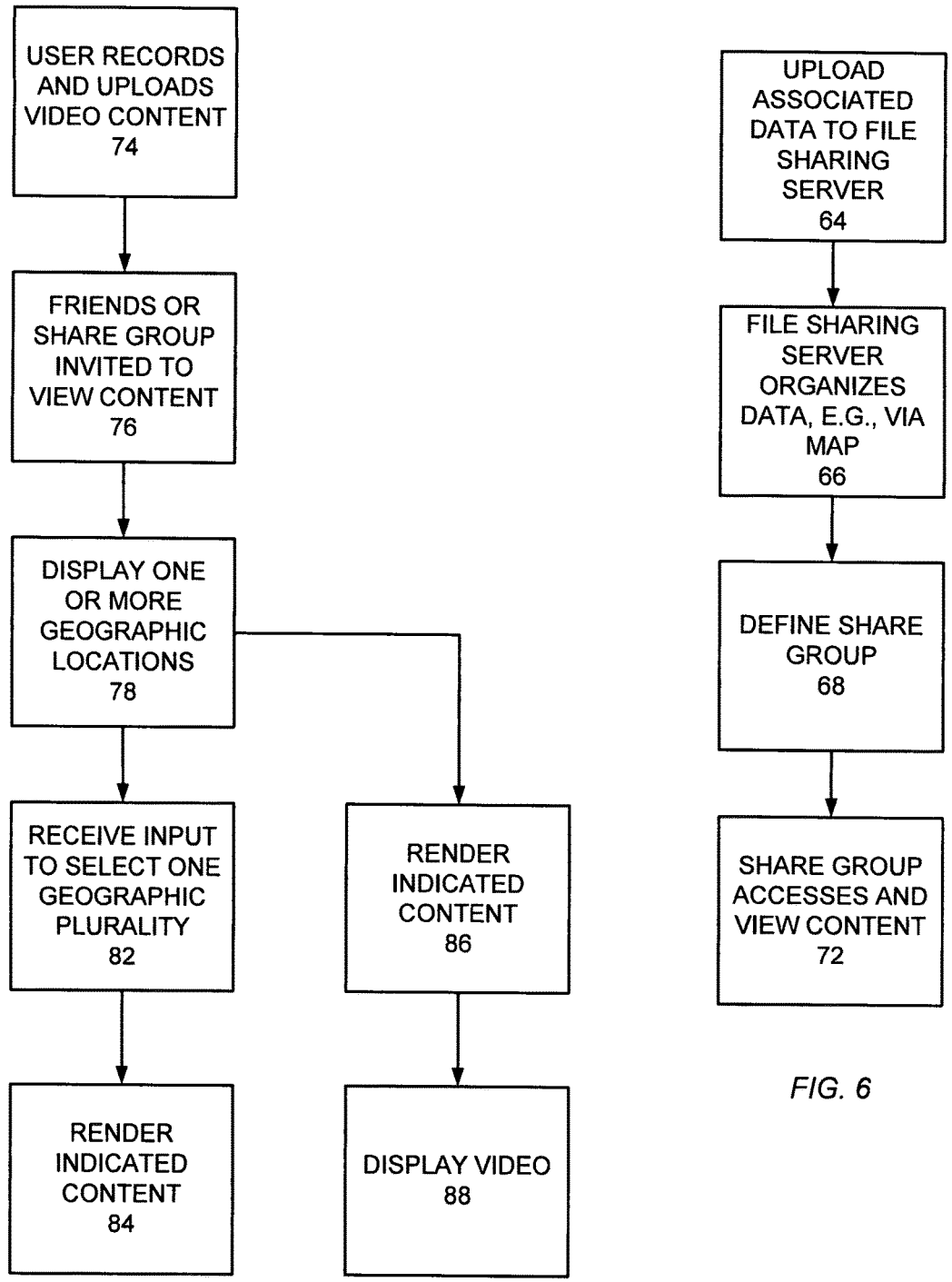

SYSTEM AND METHOD FOR OBTAINING AND SHARING CONTENT ASSOCIATED WITH GEOGRAPHIC INFORMATION

FIELD OF THE INVENTION

The invention relates to content recording, geographic location tagging of the recorded content, and sharing of the recorded and tagged content.

BACKGROUND

Prior art references purport to disclose GPS video mapping systems as well as systems that use wireless devices to create, access, and share geographical positioning data. Other prior art references purport to disclose location-tagged data provision and display systems, and methods for position-stamping photos or video clips taken with a digital camera.

Such prior art disclosures suffer from various drawbacks, however. For example, they lack the convenience and portability of a unitary full-featured system. They further lack convenient sharing capabilities, including web-based sharing capabilities.

SUMMARY

Systems and methods are provided for combining content files with geographical data and for sharing these files. The combination can then be used to create enhanced user interfaces for organizing, sharing, navigating and playing back the content files.

In one embodiment, a digital video camera is combined with a source of geographical data (such as a GPS receiver) and a connection to a computer, generally as an integral component. Video clips captured by the camera are manually or automatically tagged with appropriate geographic location data from the geographical data source, e.g., as metadata. The tagged video files are uploaded to the computer via an easy-to-use upload component. The connection to a computer may be an internet connection to a server or a direct connection to personal computer. The connection may be wired or wireless, such as a WiFi or other such connection. In the embodiment employing a wireless connection to the Internet, the tagged data files may be automatically uploaded whenever an available wireless connection is obtained or available.

A corresponding software application, which may be resident on the user's computer or which may be web-based, uses the video clips and geographical data to create an interactive user interface to browse and watch the video clips. Details vary by embodiment, but one such user interface appears as an interactive map with clickable links situated at locations where the video files were captured or as an interactive map that allows end-users to play video files associated with locations on the map. The system may also allow an indication of the time-sequence of the video clips to be displayed, such as via an arrow from point-to-point. In this way, reconstruction of, e.g., a trip may be put in proper sequential order. Clicking the links renders or plays back the video files. A link may contain information about the video such as a title and image thumbnail. For example, a video image thumbnail is displayed on the map and is clickable to play the video.

In web-based or other shared systems, the software application may limit those who can view the video clips to only one or more authorized groups of people or may leave the clips accessible to anyone. As noted, the application can be desktop installed software or a web application, but may also be resident on the camera (in which case a wired or wireless link may link the camera to a display monitor). The web application can be accessible from any terminal that has an Internet connection, though the content files may be limited to only the one or more authorized groups.

Sharing of the content files may be accomplished via "one-click" sharing using a dedicated physical or touch-screen-type button on the camera. An alternative embodiment is automatic sharing, for example, uploading and sharing without a user trigger whenever the camera is connected to the Internet.

In one aspect, the invention is directed towards a device for detecting content and associating that content with geographic information. The device includes a detector configured to receive an item of content, a detector configured to receive information corresponding to a geographic location relating to the item of content; a correspondence module configured to associate the item of content with the geographic location information; and an upload component configured to transmit the associated item of content and geographic location information to a remote system on a network.

Implementation of the invention may include one or more of the following. The content detector may be a videocamera, a still camera, or a microphone. The geographic location information detector may be a GPS receiver or a mobile phone triangulation radio-based system. The correspondence module may associate the item of content to the geographic location information using metatags or metadata. The upload component may further include a wireless transmitter. The network may be the Internet.

In another aspect, the invention is directed towards a method for associating an item of content with geographic information relating to the item of content. The method includes the steps of receiving an item of content in a device, receiving geographic location information relating to the item of content in the device, associating the item of content with the geographic location information, and uploading the associated item of content and geographic location information to a remote system on a network.

Implementation of the invention may include one or more of the following. The step of associating may occur automatically or manually. If automatically, the associating may occur in a manner such as: every time an item of content is stored, periodically, or a combination of these.

The step of uploading may occur automatically or manually. If automatically, the uploading may occur every time an item of content is stored, every time a network connection is established, periodically, or a combination of these. If manually, the uploading may occur upon user operation of a dedicated input device.

In another aspect, the invention is directed towards a computer readable medium containing instructions for causing a computer to implement the above method.

In yet a further aspect, the invention is directed towards, in a computer system having a graphical user interface including a display and a selection device, a method of providing and selecting from a menu on the display, the menu organizing and displaying content items having related geographic location information. Steps of the method include: retrieving a set of menu entries for the menu, each of the menu entries representing a geographic location; displaying the set of menu entries on the display; receiving a menu entry selection signal indicative of the selection device pointing at a selected menu entry from the set of menu entries; in response to the signal, displaying a set of content items corresponding to the geographic location; receiving a content item selection signal indicative of the selection device pointing at a selected content item from the set of content items; and in response to the signal, rendering the selected content item.

Implementations of the invention may include one or more of the following. The graphical user interface may form part of a system such as a videocamera, a computer, or a web-based browser. The step of displaying the set of menu entries on the display may include displaying the set of menu entries on a map, with each menu entry disposed at a location corresponding to its geographic location. Each menu entry may be displayed along with a name of a city or state near the corresponding geographic location. The method may further comprise displaying arrows between the displayed menu entries, the arrows indicating a time-sequence of the menu entries. The step of displaying the set of menu entries on the display may include displaying the set of menu entries in a list. The content items may be video clips.

In a related aspect, the invention is directed towards a computer readable medium containing instructions for causing a computer to implement the above method.

In another aspect, the invention is directed towards a method of sharing an item of content with a group, including the steps of creating a share group having at least one member, receiving an item of content in a device, receiving geographic location information relating to the item of content in the device, associating the item of content with the geographic location information, uploading the associated item of content and geographic location information to a remote system on a network, and notifying each member of the share group about the uploaded item of content.

Implementations of the invention may include one or more of the following. The notifying step may be accomplished by sending each member of the share group an instant message or an email about the uploaded item, where the instant message or email contains a clickable link which when clicked displays the item of content. The item of content may be displayed as a video overlayed above a map. The step of creating a share group may include inputting at least one contact into a share group list or analyzing a personal information manager to determine contacts. The instant message or email may be sent automatically whenever a content item is uploaded.

In a related aspect, the invention is directed towards a computer readable medium containing instructions for causing a computer to implement the above method.

In another aspect, the invention is directed towards a method of sharing an item of content with a group, including steps of creating a share group having at least one member, receiving an item of content in a device, receiving geographic location information relating to the item of content in the device, associating the item of content with the geographic location information, uploading the associated item of content and geographic location information to a remote system on a network, and notifying each member of the share group about the uploaded item of content. When a member of the share group attempts to access the uploaded item of content, then further steps of the method include retrieving a set of entries, each of the entries representing a geographic location, displaying the set of entries on a display, and receiving an entry selection signal indicative of the selection device pointing at a selected entry from the set of entries. Further steps include, in response to the signal, displaying a set of content items corresponding to the geographic location, receiving a content item selection signal indicative of the selection device pointing at a selected content item from the set of content items, and in response to the signal, rendering the selected content item.

Advantages of the invention may include one or more of the following. The content files with location data are easily uploadable to a computer, server or other storage. The same are navigable and may be viewed via an interactive user interface where the same are displayed as clickable links, such as by the use of thumbnails, icons or textual representations, on a map corresponding to their geographic location. The invention provides an easy-to-use and convenient process for camera users to share video with geo-data and for others to watch the video over the Internet. For example, family members may watch videos of a trip done by another family member and see where each video was shot on a map.

Other advantages will be apparent from the description that follows, including the drawings and claims.

BRIEF DESCRIPTION OF THE DRAWINGS

FIG. 5 is a flowchart illustrating a method for displaying content and geographic data according to a fifth embodiment of the invention.

FIG. 6 is a flowchart illustrating a method for sharing content and geographic location data with a group of users.

DETAILED DESCRIPTION

The following terms, defined here, are used throughout the specification and attached figures.

"Uploading" an item of content or geographic location information or both refers to the act of transferring a file containing such information from a device such as a video camera that is equipped with an upload component. The uploading is often accomplished wirelessly, but may also be accomplished using a wired connection, directly to a PC or network server.

"Storing" data or a file refers to the act of placing data in permanent or temporary memory or storage, such as in a type of RAM or disk- or card-based storage. The storing act could be very transitory. For example, data may be obtained, stored in a buffer, and uploaded immediately. On the other hand, data could be stored indefinitely on, for example, a mini-DVD.

"Geographic Location" corresponds to a location at which or near where content data was obtained. "Geographic Data" corresponds to data constituting the geographic location. An example of geographic location information is the latitude, longitude, and altitude information obtained by a GPS system. Geographic location, in this context, can further refer to information such as camera direction and orientation. An "Indication of a Geographic Location" refers to a shorthand notation for geographic information displayed in a user interface. For example, an indication of geographic information may be an icon, a display of latitude and longitude coordinates, or the name of a corresponding city and state that represents the geographic location.

"Content Item" refers to a collection of data obtained by a detector. Typically, a content item is a continuous sequence of data, for example, a video clip obtained by a video camera. "Content Data" refers to the underlying data that constitutes the content item. In some cases, a content item refers to one or more related video clips, all corresponding to a single (or set of adjacent or nearby) geographic location(s). An "Indication of the Content Item" refers to a shorthand notation for the content item displayed in a user interface. For example, an indication of a content item may be an icon, thumbnail, or filename that represents the content item. Content items may also be audio files, digital still photographs, or the like.

"Associating" a content item with a geographic location refers to the act of connecting one with another, such as by placing data corresponding to one in the file of the other. For example, associating a content item with a geographic location may refer to placing metatags or metadata about the geographic location in the file of the content item.

"Rendering" refers to the act of playing back an item of content. For example, rendering a content item that is a video clip means to play back the video clip in a media player. The media player may be any content playback device that is capable of playing back the selected type of content.

Figure 1:
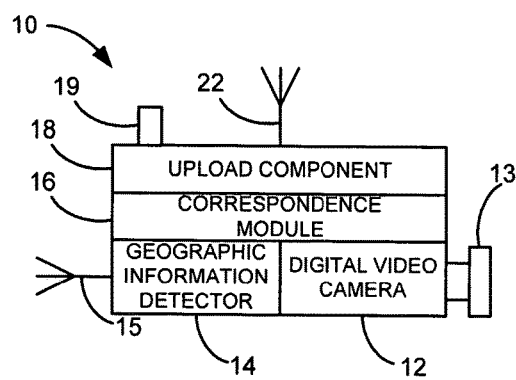
FIG. 1 illustrates a schematic diagram of a system according to a first embodiment of the invention.

A "share group" refers to a defined group of users that are a target audience of a shared file. A share group is typically defined by a user, and corresponds to that user's group of friends or other defined cohort. A share group may also be constructed automatically, such as via an analysis of user settings in a separate application, such as a social networking service. A share group may also be created on a user system using, for example, contacts information such as is stored in Microsoft Outlook® or using a buddy list in an Instant Messaging application. A share group may also be defined separately and users may join such a group using a software application or a website. For example, one such share group may be the 'Lake Tahoe Videomakers' Group. A group may also consist of only one person. In this case, sharing can be performed without specifying a group first. For example, sharing may be performed with various contacts without any formation of a group. In this example, the friend may receive an email with a link to access the video.
Content Detection System, for Example, a Videocamera Referring to FIG. 1, a content detection system 10 is shown according to a first embodiment of the invention, which may be an integrated videocamera system with an upload capability. The system 10 includes a digital videocamera 12 having a detector 13, the detector in this case including a lens and microphone to record video clips.

The system 10 also includes a detector of geographic information 14. The geographic information detector 14 often has an antenna 15, which may be internal or external. The geographic information detector 14 may be, for example, a GPS receiver. However, alternative geographic information detectors may be employed, including mobile-phone triangulation radio-based systems or other such systems. The geographic information detector 14 usually receives data such as latitude and longitude, although altitude data may also be retrieved, along with information corresponding to the orientation and direction of system 10.

The system 10 further includes a correspondence module 16, which may be implemented in hardware, software, or a combination of both. The correspondence module 16 associates the item of content with its related geographic information. For example, the correspondence module 16 may place metatags or metadata in the file of the content item, these indicating the related geographic information. In this embodiment, it is important to note that the correspondence module need not be a separate circuit or algorithm, e.g., implemented as a separate circuit or algorithm in hardware, software firmware, or the like. Rather, the correspondence module may form an integral part of the camera firmware and may be integrated with a module that saves a digital video file to local storage. The system 10 also incorporates an upload component 18. The upload component 18 organizes the transmission of data corresponding to geographic information, the content item, and their association. It is noted that in certain embodiments, as described below, the geographic location data is placed into the digital video file. In this case, and in others like it, the upload would be of the data itself, and there would not necessarily be a separate upload of geographic location information or association data. The upload component 18 may be wireless, in which case an antenna 22 may be employed. As with antenna 15, the antenna 22 may be internal or external. The upload component 18 may also be wired, in which case, for example, a USB or other such port may be provided.

In a wireless configuration, the upload may occur to a wireless access point, wireless community network, WiFi hotspot, or any other such wireless network.

A button 19 or other user-operable device may be provided to allow the user to upload the associated content and geographic information conveniently. For example, the button 19 may allow a "one-click" upload capability. In this case, depression of the button causes an immediate upload of all or a portion of the content files, e.g., whenever a network connection is available. The button 19 may also be virtual, for example, the same may be a button on a touch screen or other user interface of the camera. For example, when viewing captured video clips on a camera's LCD, one of the applicable commands for a video may be 'share online'.

Alternatively, the system 10 may automatically upload the associated content and geographic information whenever a network connection is established, for example, whenever a wireless connection is obtained, particularly where the wireless connection, such as a WiFi "hotspot", is an unsecured network.

The system components described above may be implemented in a single device, i.e., a unitary full-featured integrated video camera system with a data upload capability.

Figure 2:
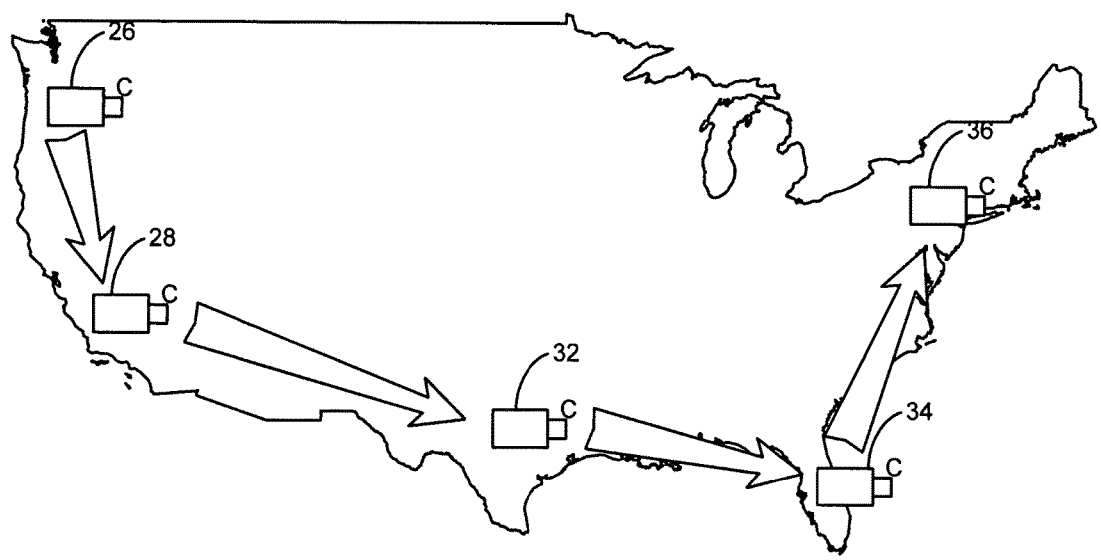
FIG. 2 illustrates a portion of a map-based user interface according to a second embodiment of the invention.

In use, the system 10 may be taken from location to location, filming content at each location, and uploading the same to a server or personal computer. Referring to FIG. 2, which indicates a portion of a user interface according to a second embodiment of the invention, and which is operable to display such content, the system 10 may be taken from location 26 to location 28, and then from location 28 to location 32, and likewise to location 34 and location 36. In each case content may be obtained, and later the content may be viewed by selection of any location indicator and further by the choice of content indicators for content obtained for that location. Indicators such as the arrows shown in FIG. 2 may be employed to indicate a time-sequence of when the content was obtained. In this way, a trip may be reconstructed and the sequence of locations visited known.

Figure 3:
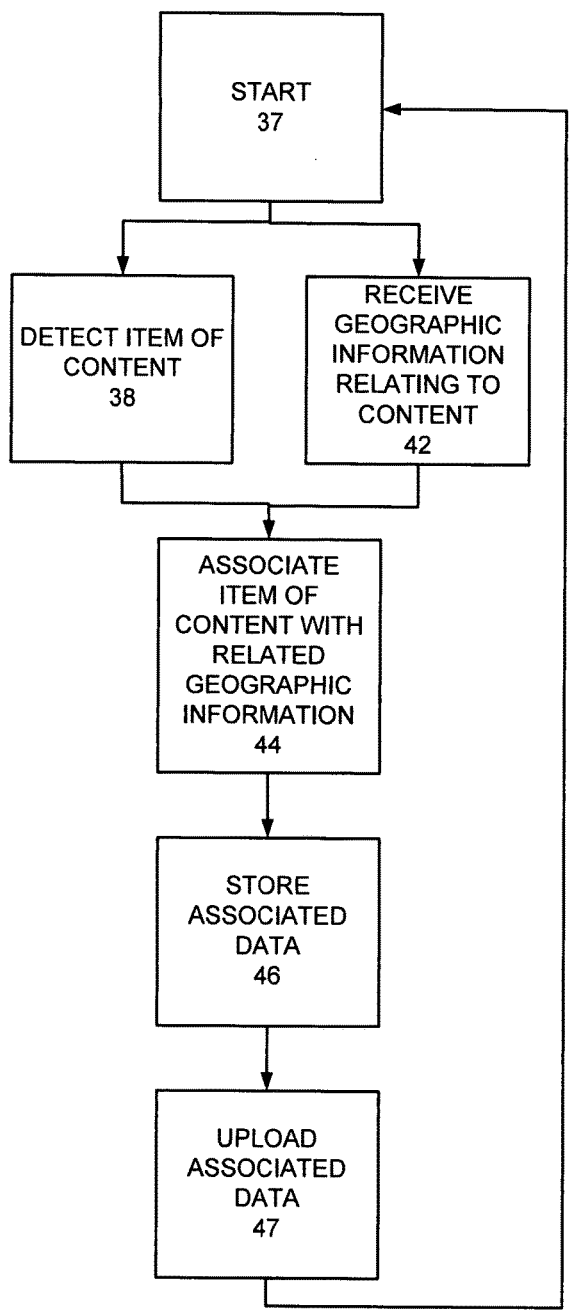
FIG. 3 is a flowchart illustrating a method for obtaining and uploading content items and geographic location information according to a third embodiment of the invention.

A method according to a third embodiment of the invention is illustrated by the flowchart of FIG. 3. The method starts (step 37) and an item of content is detected, i.e., recorded (step 38). For example, a video clip is filmed. Geographic location information is received relating to the content item (step 42). For example, GPS data may be received and used as geographic location information. The geographic location information may be obtained periodically, continuously, or at arbitrary times as designated by the user.

Geographic information may also be obtained by use of detected IP address information. In particular, geolocation software may be employed to examine the IP address and determine what country, organization, or user it has been assigned to, and then an estimate may be made as to the user's location based on that information. Such an estimate would be particularly accurate if the user were continuously connected to the Internet. However, if uploads are made only periodically, e.g., at the end of a day of video recording, then the geographic location estimated would only be correspond to the upload location, not each individual recording location.

The item of content is then associated with the geographic information (step 44). For example, metadata are added to the content item file to indicate the geographic location where the content item was obtained. In another example, a set of paired pointers are stored, with one pointer pointing to the content item and its pair pointing to the memory or storage location of the geographic information. As another example, the data corresponding to the content item and the data corresponding to the geographic location information may be combined into an entirely new data file.

The association may occur automatically or manually. In many cases, an automatic association will take place, and the system will automatically associate each content item with its related location data. In some instances, manual control may be desired, and in this case the user can decide when to attach geographic information with content items. This alternative may be preferable when the user desires to control the "granularity" of the data. For example, the user may wish for all video clips taken within a 10-mile radius to be associated with the same central city. Similarly, a hybrid association may be provided, in which automatic associations occur, but within the confines of the granularity set by the user, as described above. Alternatively, an interactive map may be displayed on the camera LCD, allowing the user to pin-point the exact location of a content item.

A further implementation is to associate geographic data with content items at an arbitrary time, for example, after all content items are recorded, at the time of upload, or at the time of display. One way of accomplishing this implementation is to record and store geographic information periodically, for example, every 15 minutes, as well as the time at which the geographic information was obtained. Content items may then be recorded and time stamped. When the association occurs, the geographic location information that has a time stamp closest-in-time to that of the content item is associated with the content item. In enhancements of this implementation, extrapolation algorithms can be employed to deduce or approximate geographic locations for content items whose time stamps are between the time stamps of the geographic location information.

The data association may then be stored (step 46). If the association occurs via placing one set of data into the other, such as via placing metadata about the geographic location into the content item, any superfluous or redundant geographic location data may then be discarded. For example, there may be no need to retain geographic location data in a separate storage location once the same has been stored as metadata in the item of content.

Upload of Content from the Content Detection System

The next step is to upload the associated data (step 47). This upload may occur wirelessly, such as via a WiFi connection, or via a wired link, for example, a PC connection such as a USB cable directly or indirectly to a computer or network. In the case of a WiFi connection, the connection may occur automatically. The upload may also occur over a network such as a LAN or WLAN.

The upload, like the association, can occur automatically or manually, the former having the potential of occurring whenever the system is connected to a network, such as a WiFi network. In some systems, the upload occurs periodically, after a predetermined period of time, for example, every 15 minutes. In other systems, the upload may occur manually, for example, via user selection and use of button 19. The upload of data may occur for all stored content items or for only a subset of all stored content items. The upload may be directly to the user's computer only, or may occur to a server. If the associated data is stored such that content items include geographic information metadata, then only the content items need be stored. If the associated data is stored as paired pointers, then the paired pointers, content items, and geographic information may all be uploaded.

User Interface for Sharing Content and Geographic Information

Figure 4:
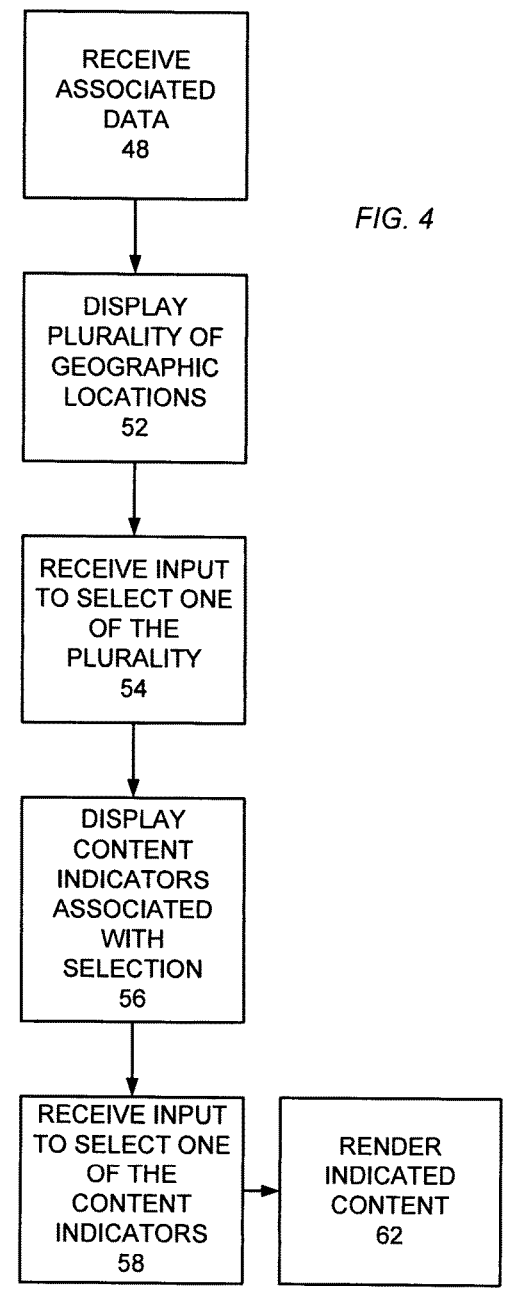
FIG. 4 is a flowchart illustrating a method for displaying content and geographic location data according to a fourth embodiment of the invention.

Referring to FIG. 4, a flowchart is shown indicating a method of displaying the associated data. A diagram of the user interface displaying the data is indicated in FIG. 2. FIG. 4 shows the first step being receiving the associated data (step 48). This receipt of associated data may be receipt of content items in the case where the content items include geographic information as metadata, or may include data such as paired pointers, content items, and geographic information as described above.

Once obtained, the geographic locations are displayed (step 52). In one implementation, the locations are displayed as situated on a map. In another, they are displayed as a list of locations. The locations may be displayed via icons, textual data such as city name, thumbnails, latitude and longitude coordinates, or via other means.

The user may then select one of the plurality of displayed geographic locations (step 54). Upon selection, if only one content item is associated with the geographic location, the content item may be rendered automatically. Alternatively, an indicator of the content item may be displayed. If multiple content items are associated with a single geographic location, then a set of indicators of such content items are displayed (step 56). These indicators may be thumbnails, icons, file names, or other such content indicators. Upon selection by the user (step 58), the indicated content item is rendered (step 62). The rendering may occur by playing back the video clip in a media player appropriate to the video content file type. In an embodiment, the playback is a streaming video playback, where the video clip content is streamed from a network server.

In one exemplary embodiment, a user may record video content in a location and upload or share the same (step 74). One or more friends, which may or may not be members of a share group, then receive an email message or an instant message when the video is available for watching (step 76). They may click a link in the message to access it. A map-like user interface may then be displayed with the location of the video indicated (step 78). The video may start playing (step 84) when a user clicks a location or icon on the user interface (step 82) or alternatively may immediately start playing when the map is displayed (step 86). In one implementation, the video is displayed (step 88). In one embodiment, the video is displayed above the map as an overlay.

In an alternative embodiment, the user interface may form part of a video camera system; in this case, the video camera system may have a wired or wireless link to a display monitor such as a computer monitor or an appropriately-enabled television.

More generally, however, the user interface forms a portion of a desktop application, or forms a portion of a web-based or other network application. In the first case, the user may choose to upload the associated data to a single personal computer, in which case the user interface pertains to a single desktop application. In the second case, the user may wish for one or more share groups to view the content files. In this case, and referring to FIG. 5, the user may upload the associated data to a file-sharing server (step 64) using appropriate file-sharing software or via a dedicated software application associated with the system. The file-sharing server organizes the associated data so that the same are presented as noted above in connection with FIGS. 4 and 5(step 66). It is noted that step 66 may include transcoding of the uploaded video file to one or more other video files for purposes of delivery of the video to different kind of applications and Internet platforms.

Using the same file-sharing software or dedicated software application, the user may define a share group (step 68). In many cases this share group definition step occurs prior to a sharing event. The user may define one or more groups, such as friends, family, or co-workers, and can select to automatically share all new uploaded video clips with that group. Alternatively, the user can choose to share an uploaded video with one or more groups online via a web application.

A downloadable web application associated with the file-sharing server may then be used to allow the share group to access and view the associated content items on the file-sharing server as displayed by the user interface (step 72). Alternatively, the viewing application may be entirely web-based with no software installed on the viewer's computer.

The share group may be defined such that only the user can access the video clips, or if no share group is defined then only the user can access it or that only several specific viewers can access the video clips, or that any person using a computer with access to the Internet can access the video clips. Previews of the video clips can also be provided so that a potential viewer need only download a small preview clip before deciding whether to download the entire large video clip. Alternatively, the video clip may be converted to another video format and streamed on-demand over the Internet.

One implementation of the invention includes one or more programmable processors and corresponding computer system components to store and execute computer instructions, such as to provide the user interface, file-sharing server, desktop and web-based applications, and the shared files. Users can access the systems through client computers with access to a network, such as the Internet.

Additional variations and implementations are also possible. For example, the shared files can be any type of data files—audio, video, text, data, and so on. The network transfer of shared files between users can be encrypted or clear. The viewing software can be stored on a server but downloaded automatically to users' systems for execution. The file-sharing server can support multiple levels of access for a shared file, for example, a preview version of a file can be made available to a large group or publicly and the full version only made available to a subset. While the term "computer" has been used, this term is intended to encompass any computing machine, including desktop computers, laptop computers, handheld computers, tablet computers, smart phones, personal digital assistants, and any other device to or from which data may be transferred. Various other examples could also be formulated given this teaching.

According to the present invention, as fully described above, systems and methods are provided for associating geographic information with content data, displaying and sharing the associated data, and controlling access to shared online media files.

While the invention has been described with respect to certain embodiments, it should be clear to one of ordinary skill in the art, given this teaching, that the invention is much broader than the embodiments shown.

For example, while a GPS receiver may typically provide a signal describing latitude and longitude of a given location, a look-up table may be employed to associate that latitude and longitude with a particular city, region, state, and/or country.

Further, while the invention has been described in the context of obtaining and retrieving video clips of, for example, trips, encrypted geographic information may also be associated with the content data, this encrypted geographic information only accessible by a secure system. In this implementation, which can also include a unique camera identifier, only certain users of the secure system can decrypt the data. In this way, the location and content of a digital recorded video can be verified and rendered tamper-proof.

Even further, besides recording trips and providing verified location data, other applications include use by a real estate agent to record geographically-organized videos of various properties they represent. After recording video clips of the properties, the agent may find a free WiFi connection and upload videos corresponding to the properties. These videos are then organized according to property location. Potential buyers may then view a map of the neighborhood and view videos about properties in the areas in which they are interested. A related online system may then conveniently allow potential buyers to contact the agent.

Accordingly, the description represents some, but not all, representations, and therefore the scope of this invention is to be limited only by the claims appended to this description.

What is claimed is:

1. An integrated unitary system for detecting content and associating that content with geographic information, comprising:
   a. a detector within the integrated unitary system configured to receive an item of content, wherein the detector is a smart phone, videocamera, still camera, or microphone;
   b. a location detector within the integrated unitary system configured to receive information corresponding to a geographic location relating to the item of content;
   c. a correspondence module within the integrated unitary system configured to associate the item of content with the geographic location information, the integrated unitary system allowing a direct association by attributing or placing metadata or metatags including geographic location information from the location detector with the item of content, whereby the integrated unitary system can perform the association while the system is at or moving from one geographic location to another, the association configured for hybrid control by the user, the hybrid control such that the user can control when to associate geographic information with items of content, the hybrid control further configured to allow user control of granularity of the items of content, such that the user can define an area to be associated with a geographic location determined by the location detector, and wherein the correspondence module performs automatic association of the item of content with the user-defined area associated with the geographic location information as well as subsequent items of content related to the same geographic location, according to the user-controlled granularity of the location data; and d. an upload component within the integrated unitary system having a wireless transmitter configured to transmit the associated item of content and geographic location information to a remote system on the Internet.

2. The system of claim 1, wherein the location detector is a GPS receiver or a mobile phone triangulation radio-based system.

3. A method for associating an item of content with geographic information relating to the item of content directly within an integrated unitary device, comprising:

a. receiving an item of content in an integrated unitary device, wherein the integrated unitary device includes a smart phone, videocamera, still camera, or microphone;

b. receiving geographic location information relating to the item of content in the integrated unitary device;

c. associating the item of content with the geographic location information within the integrated unitary device, wherein the associating is performed by attributing metatags or metadata containing the geographic location information to a file associated with the item of content and wherein the associating occurs in a manner selected from the group consisting of: every time an item of content is stored, periodically, upon user input, or a combination, whereby the integrated unitary device can perform the association while the device is at or moving from one geographic location to another, and wherein the associating is configured for hybrid control by the user, the hybrid control such that the user can control when to attach geographic information with items of content, the hybrid control further configured to allow user control of granularity of the items of content, such that the user can define an area to be associated with a geographic location determined by the location detector, and further comprising performing automatic association of the item of content with the user-defined area associated with the geographic location information as well as subsequent items of content related to the same geographic location, according to the user-controlled granularity of the location data; and d. wirelessly uploading the associated item of content and geographic location information to a remote system on the Internet, wherein the uploading occurs in a manner selected from the group consisting of: every time an item of content is stored, every time a network connection is established, periodically, upon user input, or a combination of the above.

4. The method of claim 3, wherein the receiving geographic location information is performed using a GPS receiver or a mobile phone triangulation radio-based system.

5. A non-transitory computer readable medium containing instructions for causing a computer to implement the method of claim 3.

6. In a computer system having a graphical user interface including a display and a selection device, a method of providing and selecting from a menu on the display, the menu organizing and displaying content items having related geographic location information, the method comprising:

a. retrieving a set of menu entries for the menu, each of the menu entries including data about a geographic location;

b. causing a display of the set of menu entries on the display of a system, the system being a smart phone, videocamera, computer, or computing environment with a web-based browser, and wherein the displaying the set of menu entries on the display includes displaying the set of menu entries on a map, with each menu entry disposed on the map at one or more user-defined areas automatically associated with locations within geographic location information, the user-defined areas associated with user-controlled granularity of the geographic location information as well as subsequent items of content related to the same geographic location, wherein the display of the set of menu entries indicates a time sequence of when the content items were obtained;

c. receiving a menu entry selection signal indicative of the selection device pointing at a selected menu entry from the set of menu entries;

d. in response to the signal, causing a display of a set of content items corresponding to the geographic location;

e. receiving a content item selection signal indicative of the selection device selecting a content item from the set of content items; and f. in response to the signal, causing a rendering of the selected content item on the display.

7. The method of claim 6, wherein each menu entry is displayed along with a name of a city or state near the corresponding geographic location.

8. The method of claim 6, further comprising displaying arrows between the displayed menu entries on the map or list, the arrows indicating a time-sequence of the menu entries.

9. The method of claim 6, wherein the content items are video clips.

10. The method of claim 6, wherein the set of content items includes only one content item.

11. The method of claim 6, wherein the causing a rendering includes causing a video to play back, the video resident on a file sharing server.

12. The method of claim 6, wherein the indication of a time sequence of when the content items were obtained includes displaying an arrow from one menu entry to another, the arrow indicating the time sequence of when the content items were obtained.

13. A non-transitory computer-readable medium containing instructions for causing a computer to implement the method of claim 6.

14. A method of sharing an item of content with a group, comprising:

a. defining or creating a share group prior to a sharing event having a set of members by inputting contacts into a share group list or analyzing a personal information manager to determine contacts;

b. receiving an item of content in an integrated unitary device, the device being a smart phone, videocamera, still camera, or microphone, receiving geographic location information relating to the item of content in the integrated unitary device, and associating the item of content with the geographic location information in the integrated unitary device, whereby the integrated unitary device can perform the associating while the system is at or moving between geographic locations, and wherein a user can define an area to be associated with a geographic location within the geographic location information, and further comprising performing automatic association of the item of content with the user-defined area associated with the geographic location information as well as subsequent items of content related to the same geographic location, according to a user-controlled granularity of the geographic location information;

c. uploading the associated item of content and geographic location information to a remote system on a network; and d. notifying each member of the share group about the uploaded item of content, wherein the notifying is accomplished by sending each member of the share group an instant message or an e-mail about the uploaded item, wherein the instant message or email contains a clickable link which when clicked initiates a display of the item of content.

15. The method of claim 14, wherein the instant message or email is sent automatically whenever a content item is uploaded.

16. A non-transitory computer-readable medium containing instructions for causing a computer to implement the method of claim 14.

17. A method of sharing an item of content with a group, comprising:

a. defining or creating a share group prior to a sharing event having at least one member by inputting at least one contact into a share group list or analyzing a personal information manager to determine contacts;

b. receiving an item of content in an integrated unitary device, the device being a smart phone, videocamera, still camera, or microphone, receiving geographic location information relating to the item of content in the integrated unitary device, and associating the item of content with the geographic location information in the integrated unitary device, whereby the integrated unitary device can perform the associating while the system is at or moving between geographic locations, and wherein a user can define an area to be associated with a geographic location within the geographic location information, and further comprising performing automatic association of the item of content with the user-defined area associated with the geographic location information as well as subsequent items of content related to the same geographic location, according to a user-controlled granularity of the geographic location information;

c. wirelessly uploading the associated item of content and geographic location information to a remote system on the Internet;

d. notifying each member of the share group about the uploaded item of content, wherein the notifying is accomplished by sending each member of the share group an instant message or an e-mail about the uploaded item wherein the instant message or email contains a clickable link which when clicked initiates a display of the item of content;

e. and when a member of the share group attempts to access the uploaded item of content, then:

i. retrieving a set of entries, each of the entries including data about a geographic location;

ii. causing a display of the set of entries on a display, the entries displayed on a map according to geographic location, wherein the display of the set of menu entries indicates a time sequence of when the content items were obtained;

iii. receiving an entry selection signal indicative of the selection device selecting an entry from the set of entries;

iv. in response to the signal, causing a display of a set of content items corresponding to the geographic location and corresponding to the selected entry;

v. receiving a content item selection signal indicative of the selection device selecting a content item from the set of content items;

and vi. in response to the signal, causing a rendering of the selected content item.

18. The method of claim 17, wherein the set of content items includes only one content item.

19. The method of claim 17, wherein the causing a rendering includes causing a video to play back, the video resident on a file sharing server.

20. The method of claim 17, wherein the indication of a time sequence of when the content items were obtained includes displaying an arrow from one menu entry to another, the arrow indicating the time sequence of when the content items were obtained.

* * * * *